United States Patent
Sanders

(10) Patent No.: US 6,321,007 B1
(45) Date of Patent: Nov. 20, 2001

(54) OPTICAL FIBER HAVING A BRAGG GRATING FORMED IN ITS CLADDING

(75) Inventor: Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/448,733

(22) Filed: Nov. 24, 1999

(51) Int. Cl.$^7$ ..................................................... G02B 6/34
(52) U.S. Cl. ............................ 385/37; 385/124; 385/126
(58) Field of Search .......................... 385/37, 122–128; 372/6

(56) References Cited

U.S. PATENT DOCUMENTS

| | | | |
|---|---|---|---|
| 5,195,161 | 3/1993 | Adar et al. | 385/129 |
| 5,581,642 | 12/1996 | Deacon et al. | 385/15 |
| 5,627,848 | 5/1997 | Fermann et al. | 372/18 |
| 5,694,248 | 12/1997 | Erdogan et al. | 359/570 |
| 5,781,670 | 7/1998 | Deacon et al. | 385/10 |
| 6,104,852 | * 8/2000 | Kashyap | 385/123 |

OTHER PUBLICATIONS

E. Delevaque et al., "Optical Fiber Design for Strong Gratings Photoimprinting with Radiation Mode Suppression," Proc. Opt. Fiber. Comm. Conf., 1995, postdeadline paper PD5.

* cited by examiner

*Primary Examiner*—Phan T. H. Palmer
(74) *Attorney, Agent, or Firm*—Ware, Fressola, Van Der Sluys & Adolphson LLP

(57) ABSTRACT

A single mode optical fiber, having a pure silica core and a cladding, and having a Bragg grating in along a length of some of the cladding, providing reflectivity in some of the cladding but not in the core, and a method for making same. Because the core is pure silica, it is unaffected by exposure to ultraviolet light, and so the process of imprinting a Bragg grating does not affect the refractive index of the core. The portion of the cladding in which the Bragg grating is to be imprinted is a glass containing an index-lowering dopant, such as fluorine, as well as a photosensitizing dopant, such as germanium. Exposure to ultraviolet light therefore forms a Bragg grating in a portion of the cladding, but not in the core, providing reflectivity in the cladding, but not in the core. A second portion of cladding can also be provided, surrounding the portion doped with the photosensitizing dopant. The second portion of cladding is an outer cladding, surrounding the doped portion, which abuts the core.

20 Claims, 3 Drawing Sheets

OPTICAL FIBER HAVING A BRAGG GRATING FORMED IN ITS CLADDING

FIELD OF THE INVENTION

The present invention pertains to the field of optical fibers. More particularly, the present invention pertains to optical fibers having a core and a cladding, and having a Bragg grating formed exclusively in the cladding.

BACKGROUND OF THE INVENTION

According to the prior art, a Bragg grating in an optical fiber is usually created in the core region of the optical fiber. A core region suitable for an optical fiber in which a Bragg grating is to be created typically includes a core region of silica containing germanium or other known photosensitizing dopants so as to impart to the core region, by exposure to ultraviolet (UV) light, the photo-refractive structure known as a Bragg grating.

Bragg gratings are generally produced in such a doped silica core of an optical fiber by laterally exposing the optical fiber to a three dimensional fringe pattern created by holographically interfering two coherent high intensity coherent UV beams, or by exposing the optical fiber to UV light passed through a diffractive optical element called a phase mask. The doped glass, by virtue of the lattice defects (in this case point imperfections) associated with the dopants, interacts with the bright portions of a UV pattern to produce light-absorbing color centers. Either technique produces a pattern of UV light consisting of alternating bright and dark regions. The doped glass interacts with the bright portions of the UV pattern in such a way that its refractive index is modified leaving a refractive index modulated according to the UV pattern.

The use of Bragg gratings has been demonstrated in commercial telecommunications-grade optical fibers that contain germanium in the core (Corning SMF-28 for example). However, high photosensitivity of these optical fibers is needed to achieve high reflectivity gratings and compatibility with manufacturing processes within reasonable exposure parameters. This has led to the use of hydrogenation, along with the development of special optical fibers containing high levels of germanium or other photosensitizing dopants, as a means to increase the number of defect centers to promote optical fiber photosensitivity. Pure silica core optical fibers, which contain little or no such defects, have been found unsuitable as a host material for forming Bragg gratings using UV exposure processes.

In step-index single-mode optical fibers, the transverse field distribution of the fundamental mode extends slightly beyond the core region, with a small amount of power carried in the part of the cladding immediately adjacent the core. The amount of power is on the order of 10–12% with mode parameters of typical communications-grade optical fibers.

In providing a Bragg grating in an optical fiber, coupling to cladding modes of light at the Bragg grating is sometimes suppressed by photosensitizing both the core and the cladding, and so extending the Bragg grating beyond the transverse mode field distribution. (See, e.g. E. Delevaque et al., "Optical Fiber Design For Strong Gratings Photoimprinting With Radiation Mode Suppression", Proc. Opt. Fiber. Comm. Conf., 1995, postdeadline paper PD5.) This approach demonstrates the ability to imprint a Bragg grating in a photosensitized cladding region of an optical fiber as well as in a photosensitized core. It also demonstrates light interaction between the mode evanescent field and fiber cladding region of the fiber.

With this approach, the reflectivity of the Bragg grating is high, even though only a small percentage of the reflected power is conveyed by the cladding. In a number of applications, however, what is needed is low reflectivity of light by a Bragg grating. Such applications include defining arrays of grating-based Fabry-Perot interferometers, and providing wavelength stabilization of laser diodes. If a Bragg grating could be formed in only the cladding of an optical fiber, the reflected power would be suitable for such applications.

SUMMARY OF THE INVENTION

Accordingly, the present invention provides an optical fiber with a cladding and having a Bragg grating confined to the cladding and a method for providing same. The method includes as steps: providing an optical fiber having a silica core substantially free of dopants, and also having a cladding; doping a portion of the cladding with an index-lowering dopant; doping a length of the portion of the cladding with a photosensitizing dopant; and exposing the length of the portion of the cladding to an interference pattern of ultraviolet light; thereby forming a Bragg grating only in a length of a cladding portion of the optical fiber.

In one aspect of the invention, the optical fiber is a single-mode optical fiber.

In some applications of the method of the invention, the index-lowering dopant is fluorine and the photosensitizing dopant is germanium.

In another aspect of the invention, a second, non-doped portion of the cladding, enclosing the portion that is doped, is also provided. The Bragg grating is, however, confined to the portion of the cladding that is doped, because the outer cladding is not doped with photosensitizing dopants. (Nor is it doped with index-lowering dopants.)

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
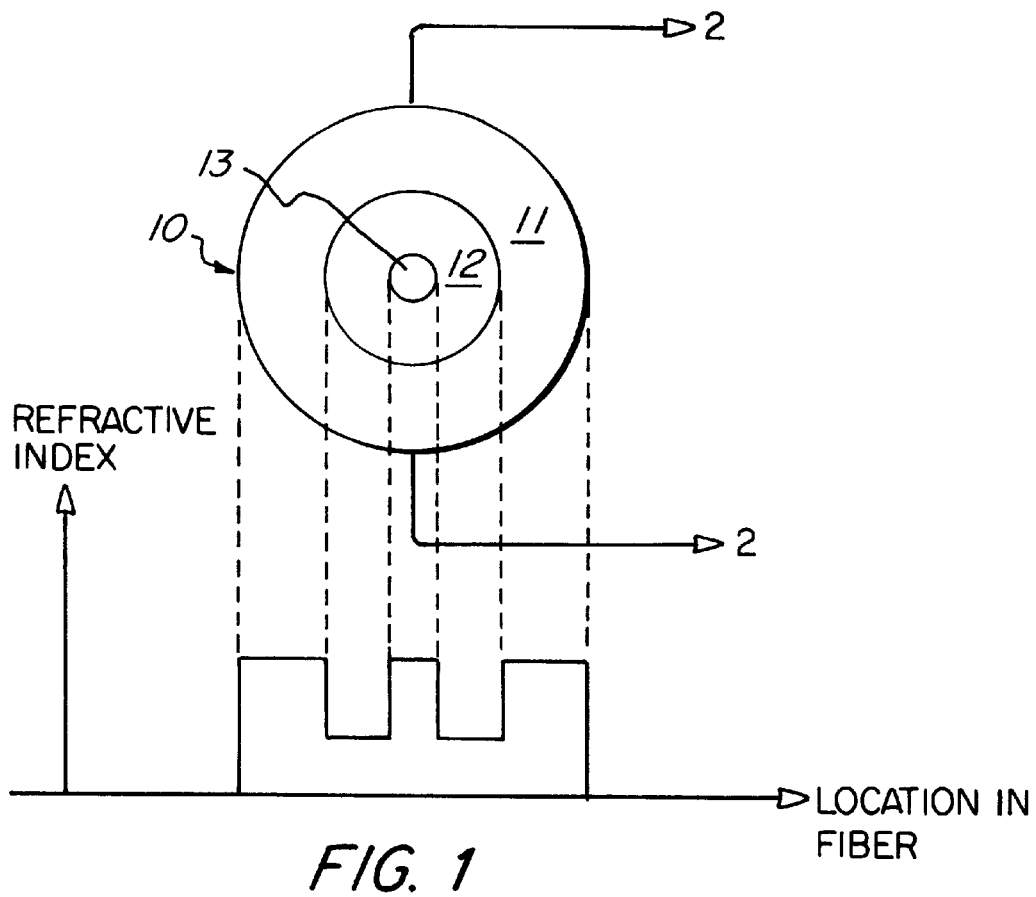
FIG. 1 is a transverse cross section of an optical fiber doped according to the present invention, shown in relation to a graph of refractive index of the fiber's core, inner cladding and outer cladding.
Figure 2:
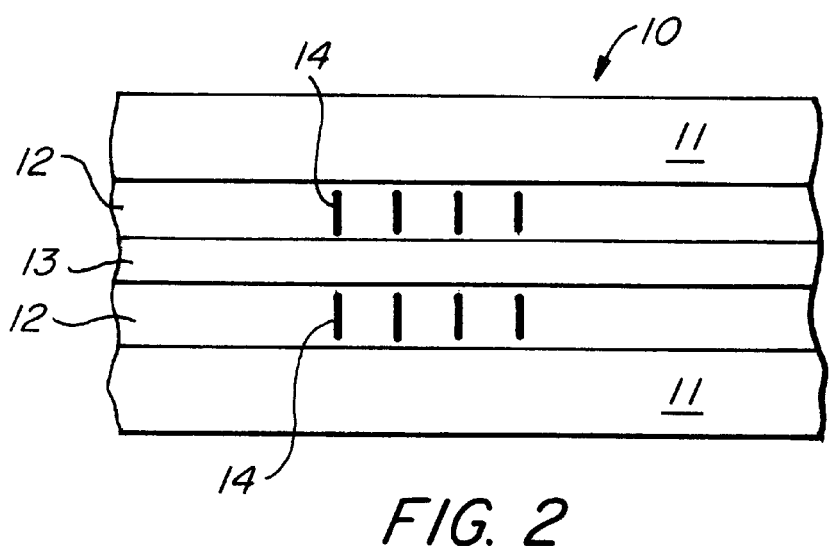
FIG. 2 is a longitudinal cross section, corresponding to FIG. 1, showing a Bragg grating imprinted in an optical fiber according to the present invention.

Referring to FIGS. 1 and 2, an optical fiber 10, having a Bragg grating according to the best mode of the present invention, is shown as having a core 13 of pure silica, typically 8 um in diameter, surrounded by a glass (typically silica) cladding 11, 12 of which an inner cladding 12 is doped with an index-lowering dopant, preferably fluorine, and is also doped with a suitable amount of photosensitizing dopant, preferably germanium. The outer cladding 11 is not doped. The entire cladding 11 12 typically extends out to a diameter of 125 um, with the doped inner cladding 12 extending to well beyond the mode field, typically to 60 um. The optical fiber is preferably a single-mode optical fiber.

By exposing a length of the optical fiber 10 to ultraviolet (UV) light produced e.g. by interfering holographically two coherent beams of UV light, or by passing UV light through a phase mask, a Bragg grating 14 (see FIG. 2) is imprinted over the length of the optical fiber. As shown in FIG. 2, the Bragg grating is imprinted in the inner cladding 12 of the optical fiber 10, but not in the core 13 or in the outer cladding 11.

FIG. 1 also indicates the variation of the index of refraction along a transverse cross section of the optical fiber 10. The graph in FIG. 1 shows that the doped region of the optical fiber 10 (the inner cladding 12) has a lower index than the non-doped regions (the core 13 and the outer cladding 11). In some applications, the difference between the index in the doped region and the refractive index in the non-doped regions is typically approximately 0.03% of the refractive index in the non-doped regions 11 13.

Figure 3:
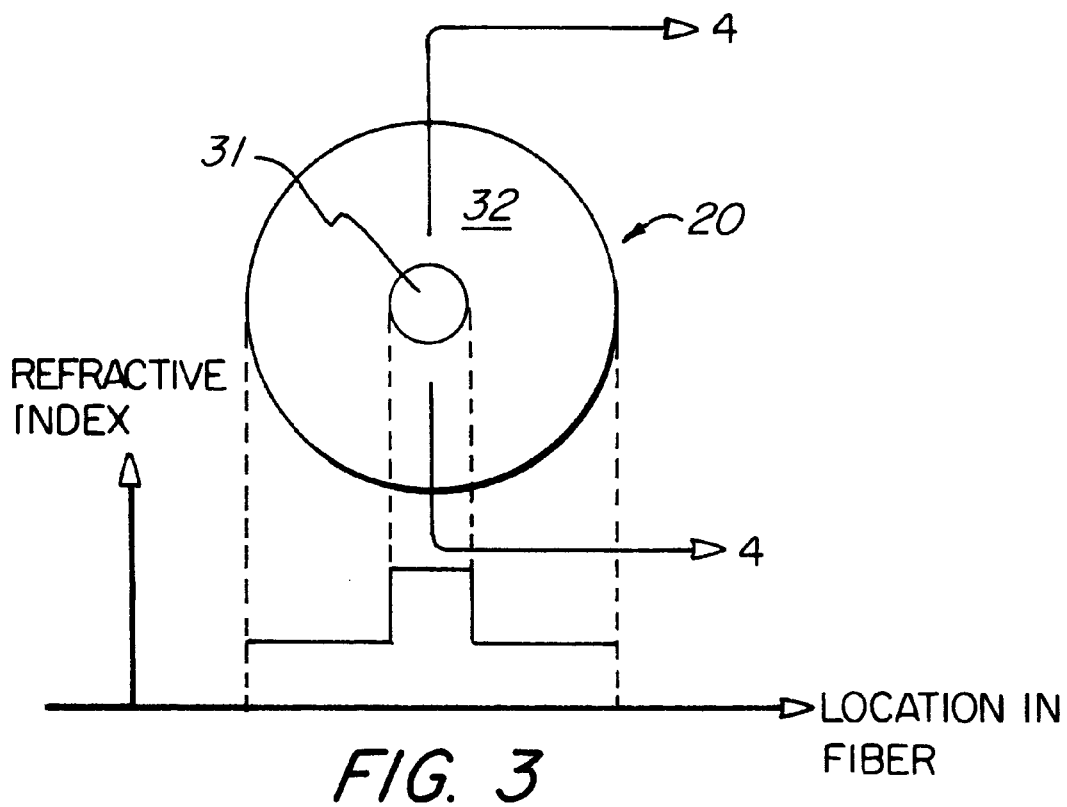
FIG. 3 is a transverse cross section of an optical fiber doped according to a second embodiment of the present invention, shown in relation to a graph of refractive index of the fiber's core and cladding.
Figure 4:
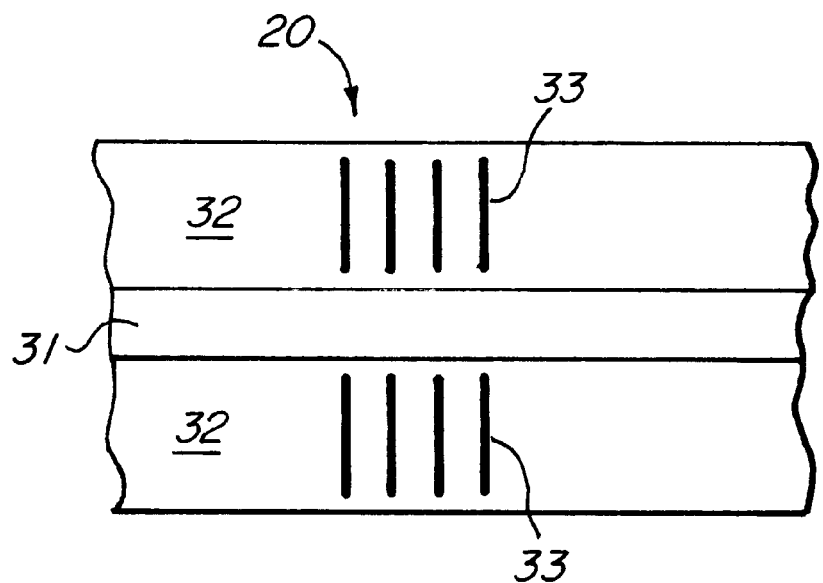
FIG. 4 is a longitudinal cross section, corresponding to FIG. 3, showing a Bragg grating imprinted in an optical fiber according to the second embodiment of the present invention.

Referring now to FIGS. 3 and 4, another embodiment of an optical fiber 20 having a Bragg grating according to the present invention is shown as having a core 31 of pure silica, typically 8 um in diameter, surrounded by a glass cladding 32 (typically silica) doped with an index-lowering dopant, preferably fluorine, as well as doped with a suitable amount of photosensitizing dopant, preferably germanium. The cladding typically extends out to a diameter of 125 um and a Bragg grating 33 (FIG. 4) is imprinted in the cladding 32 over some length of the optical fiber using the same methods as described above. The optical fiber is again preferably a single-mode optical fiber.

To photosensitize a cladding, photosensitizing dopants are preferably diffused into the cladding. The photosensitizing dopant is preferably germanium. It is also possible to use other materials, including reagents such as fluorine or hydroxyl ions. The diffusion is accomplished preferably by the technique of heating the cladding in the presence of the photosensitizing dopant, or by the technique of exposing the cladding to the photosensitizing dopant under high pressure, or by both techniques in combination.

Figure 5:
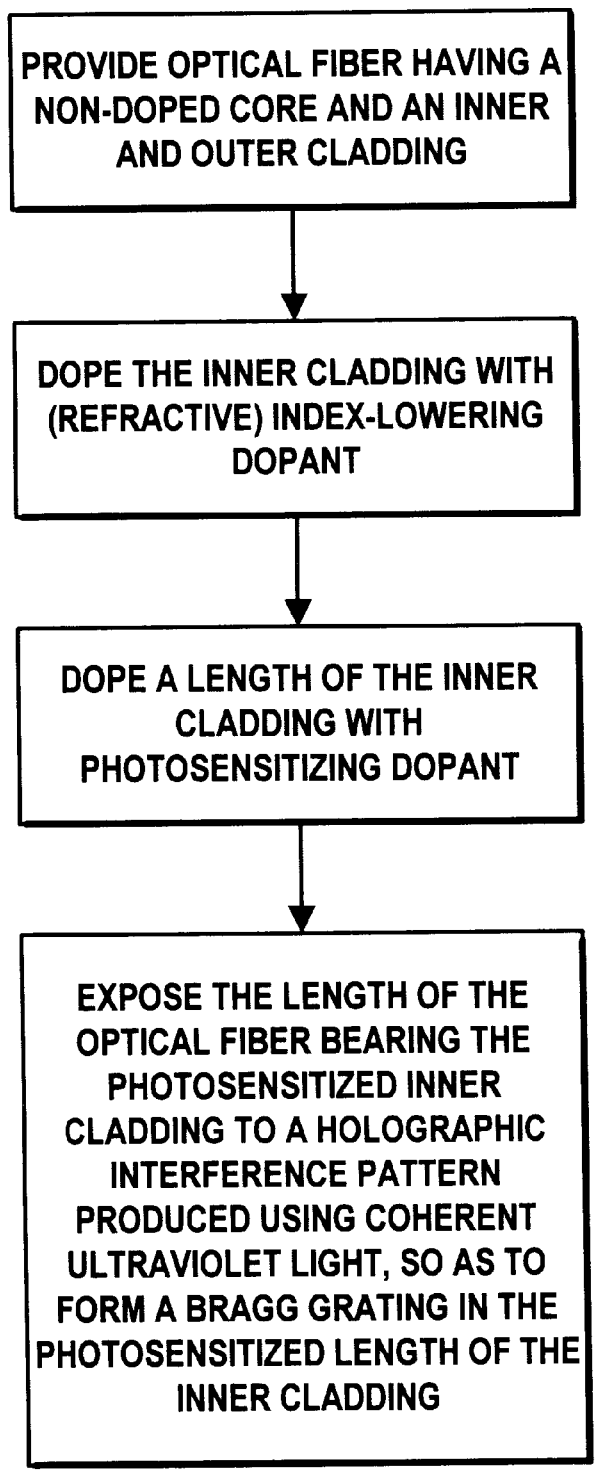
FIG. 5 is a flowchart of the method of the present invention.

FIG. 5 is a flowchart indicating the steps of the invention in the preferred embodiment.

Theory of Operation

The photo-refractive effects, i.e. the modulation of the index of refraction, is associated with the defects (variations) in the molecular structure of the core attributable to the dopants. Pure silica glasses, and subsequently pure silica core optical fibers, have been shown to contain little or no defects. Therefore, the index of such a material is difficult to modulate by exposing the material to UV light, and thus such a material is not suitable for producing a Bragg grating.

However, when a Bragg grating is imprinted in the cladding of a pure silica core optical fiber, and light is introduced at a launch end into the optical fiber so as to propagate in the core, the Bragg grating interacts with a portion of the propagating (evanescent) wave so as to excite and transfer power to a counter-propagating mode in the cladding. Thus, reflected light is received back at the launch end of the fiber.

Optical fibers with a pure silica core, and such optical fibers having a Bragg grating according to the present invention, have demonstrated performance in connection with a number of environmental and nonlinear effects that is superior to that of doped-core optical fibers, especially those in which commercial intra-core fiber gratings are provided. The invention therefore enables Bragg gratings to be produced and operate in a fiber media that has superior environmental and optical performance.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. An optical waveguide comprising:
   a core formed of silica that is substantially free of dopants;
   a cladding being disposed about the core, the cladding including an index-lowering dopant, wherein the refractive index of the cladding is less than the refractive index of the core; and
   a grating being disposed only in the cladding.

2. The optical waveguide of claim 1, wherein the core is formed of pure silica.

3. The optical waveguide of claim 1, wherein the index-lowering dopant is fluorine.

4. The optical waveguide of claim 1, wherein the cladding further includes a photosensitizing dopant.

5. The optical waveguide of claim 4, wherein the photosensitizing dopant is at least one of germanium, fluorine and hydroxyl ions.

6. The optical waveguide of claim 1, wherein the grating is a Bragg grating.

7. The optical waveguide of claim 1, wherein the difference between the refractive index of the core and the refractive index of the cladding is approximately 0.03% of the refractive index of the core.

8. The optical waveguide of claim 1, wherein the optical waveguide is a single-mode optical fiber.

9. The optical waveguide of claim 1, wherein the grating is disposed radially within the entire cladding along a predetermined axial length.

10. An optical waveguide comprising:
    a core formed of silica that is substantially free of dopants;
    an inner cladding being disposed about the core, the inner cladding including an index-lowering dopant, wherein the refractive index of the inner cladding is lower than the refractive index of the core;
    an outer cladding being disposed about the inner cladding, wherein the refractive index of the outer cladding is greater than the refractive index of the inner cladding; and
    a grating being disposed only in the inner cladding.

11. The optical waveguide of claim 10, wherein the core is formed of pure silica.

12. The optical waveguide of claim 10, wherein the index-lowering dopant is fluorine.

13. The optical waveguide of claim 10, wherein the outer cladding is substantially free of dopants.

14. The optical waveguide of claim 10, wherein the inner cladding further includes a photosensitizing dopant.

15. The optical waveguide of claim 14, wherein the photosensitizing dopant is at least one of germanium, fluorine and hydroxyl ions.

16. The optical waveguide of claim 10, wherein the grating is a Bragg grating.

17. The optical waveguide of claim 10, wherein the outer cladding is formed of silica that is substantially free of dopants.

18. The optical waveguide of claim 10, wherein the optical waveguide is a single-mode optical fiber.

19. A method for providing an optical waveguide including a Bragg grating disposed only in a cladding of the optical waveguide, the method comprising:
  a) providing an optical waveguide including a core disposed within the cladding, the core being formed of silica that is substantially free of dopants;
  b) doping a portion of the cladding with an index-lowering dopant;
  c) doping a length of the portion of the cladding with a photosensitizing dopant; and
  d) forming a Bragg grating only in a portion of cladding that is doped with the photosensitizing dopant.

20. A method for providing an optical waveguide including a Bragg grating disposed only in a cladding of the optical waveguide, the method comprising:
  a) providing an optical waveguide including a core disposed within the cladding, the core being formed of silica that is substantially free of dopants;
  b) doping a portion of the cladding with an index-lowering dopant;
  c) photosensitizing a length of the portion of the cladding; and
  d) forming a Bragg grating only in a portion of cladding that is doped with the photosensitizing dopant.

\* \* \* \* \*